United States Patent [19]

Goodman et al.

[11] Patent Number: 5,015,002
[45] Date of Patent: May 14, 1991

[54] PROTECTIVE BELLOWS

[75] Inventors: Clarence R. Goodman, Peoria; Jerry R. Presley, Lake Havasu City, both of Ariz.

[73] Assignee: Daystar, Inc., Glendale, Ariz.

[21] Appl. No.: 546,246

[22] Filed: Jun. 29, 1990

[51] Int. Cl.⁵ .............................................. B61F 15/22
[52] U.S. Cl. .............................. 277/212 FB; 139/109; 139/119; 139/121; 188/322.12; D23/384
[58] Field of Search .................. 29/454; 138/121, 109, 138/119, 224, 226, 227; 188/322.12; 267/64.27, 122, 64.19, 64.23; D23/384

[56] References Cited

U.S. PATENT DOCUMENTS 3,076,669 2/1963 Schlein ............................ 138/121 X
4,515,842 5/1985 Kovacs ........................... 138/119 X
4,529,213 7/1985 Goodman ................... 188/322.12 X Primary Examiner—Timothy V. Eley
Assistant Examiner—R. Martin
Attorney, Agent, or Firm—Cahill, Sutton & Thomas

[57] ABSTRACT

A plurality of axially aligned bellows are formed in the cuff of a protective boot to accommodate a large diametric range of cylinders to be encircled by the cuff.

18 Claims, 2 Drawing Sheets

PROTECTIVE BELLOWS

BACKGROUND OF THE INVENTION

1. Field of the Invention

The present invention relates to protective bellows and, more particularly, to the cuff configuration of a protective bellows.

2. Description of the Prior Art

Protective bellows have been used for a period of years to protect various extensible devices, such as linear actuators, industrial components and automotive components. Within the field of automotive components, protective bellows are used primarily with shock absorbers, MacPherson struts, steering dampers and the like.

Economy of manufacture is always a prime criterion for any product. This is particularly true for relatively low cost high volume products. Within the field of automotive components, the items to be protected vary in travel length required and configuration and size attendant the opposed ends of the bellows. For a manufacturer, it is costly to manufacture a protective bellows for each product of a line of products unless the number of same size bellows is very large. Similarly, for a supplier, it is costly in terms of shipping, storage and handling to maintain a large inventory of differently sized protective bellows. These increased costs ultimately must be borne by the end user or consumer to his detriment.

With respect to a protective bellows, there are three components which affect the universality or genericness of the device. These are travel, top attachment mechanism and bottom attachment mechanism. With regard to shock absorbers, manufacturers have generally agreed to install a fixed size washer on the plunger of the shock absorber at the point at which the protective bellows, or boot, as it is commonly referred to, is attached. Hence, one end of the boot, no matter what the remaining parts may be like, is generally standardized.

The question of travel, compression and expansion, of the boot, can be accommodated within a specific range or ranges through careful selection of the number of bellows and their respective interior and exterior diameters. Accordingly, a small number of families of bellows size will accommodate substantially all shock absorber installations with respect to top end attachment and length of travel.

The diameter of a cylinder or "can", as it is referred to, of a shock absorber can vary in size from approximately 1¾ inches to approximately 2⅜ inches. A boot is made of resilient elastic material and the lower end, or cuff can be stretched to a certain extent to accommodate, within the range of stretch, certain can diameters. Since the material of which boots are generally made, a stretch greater than 5% is beyond the norm. This limitation of materials necessitates the manufacture and stocking of a plurality of families of shock absorber boots having different sized cuffs. One solution to assist in stretching a cuff has been that of slitting the cuff. Such slitting is generally not considered an acceptable solution from an engineering standpoint; stresses imposed upon the boot may result in rapid tearing and deterioration.

Because the boot compresses and expands in response to elongation and shortening of the device protected, the volume of air within the bellows may change rapidly and substantially. Venting of the bellows must therefore be accommodated. Such venting is often done by punching a hole in the bellows. This is an inelegant solution and also requires additional expense during either manufacture or installation.

SUMMARY OF THE INVENTION

The cuff of a boot includes one or more axially aligned bellows to permit circumferential expansion of the cuff by flattening the bellows commensurate with the degree of circumferential expansion. The grip provided by the degree of elasticity of the cuff may, in most circumstances, eliminate the need for ties or clamps to secure the cuff in place. Because the complete inner surface area of the axially oriented bellows will not be adjacent the encircled can, fluid communication between the interior of the boot and the surrounding air will be provided through the axially aligned bellows and permit venting.

It is therefore a primary object of the present invention to provide a protective bellows having a substantially circumferentially expandable cuff.

Another object of the present invention is to provide a cuff for a protective bellows which will vent the bellows.

Still another object of the present invention is to provide a protective bellows configuration which will accommodate a variety of applications.

Yet another object of the present invention is to provide a cuff of a boot with a plurality of axially aligned bellows to accommodate a large range of diameters.

A further object of the present invention is to provide an expansible cuff for a boot with sufficient elasticity to maintain retention during normal use.

A still further object of the present invention is to provide a cuff for an automotive boot which will accommodate a wide range of shock absorber cylinder diameters.

A yet further object of the present invention is to provide a method for securing a boot to a number of differently sized shock absorber cylinders.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
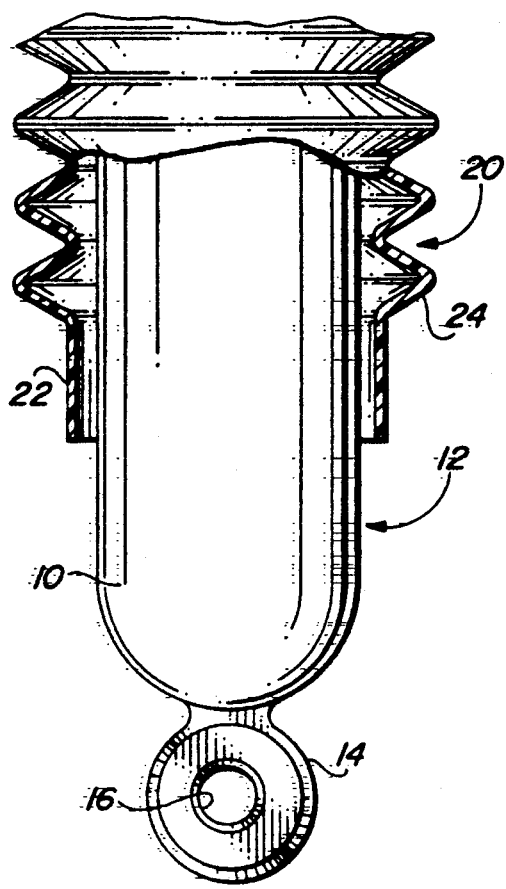
FIG. 1 is a cross sectional view illustrating part of a conventional automotive shock absorber and part of a boot attached thereto.

Cylinder end 10 of a conventional automotive shock absorber 12 is partially shown in cross section in FIG. 1. A lug 14 extends from cylinder end 10 and includes an aperture 16. Usually, a bolt penetrably engages aperture 16 to attach cylinder end 10 to the frame of an automobile, trailer or other vehicle. The plunger of the shock absorber (not shown) includes a further lug for attachment by bolt means to the component moveable with respect to the frame of the vehicle. The plunger, serving as a piston or having attached thereto a piston for translation within the cylinder of the shock absorber must be protected against dirt, debris, water, etc. to permit the shock absorber to maintain a normal useful life. Such protection is generally provided by a protective bellows, referred to in the automotive world as a boot. One end of the boot is generally secured to an industry standard washer located close to the lug at the end of the plunger. The center part of the boot includes a plurality of circular bellows to accommodate contraction and expansion of the shock absorber. The cuff of the boot is secured about the cylinder of the shock absorber.

A boot 20 is partially shown in FIG. 1 and includes a cuff 22 surrounding cylinder end 10. Radially oriented bellows 24 extend from the cuff to accommodate contraction and expansion of the shock absorber. The cuff 20 is positionally maintained about cylinder end 10 as a function of the elasticity of the material of the cuff. Alternatively, the cuff may be secured by a clamp, ties or the like.

Figure 2:
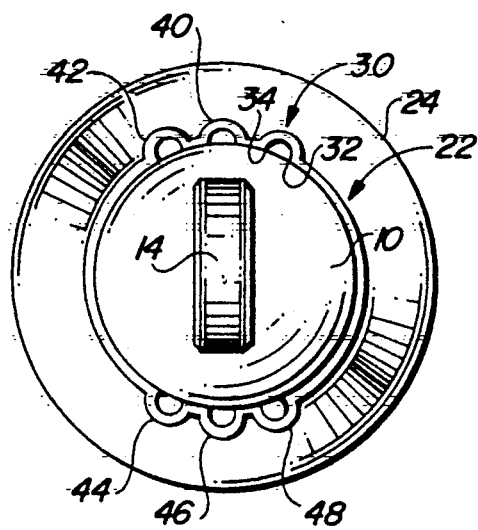
FIG. 2 is an end view of the boot secured to the cylinder of an automotive shock absorber.
Figure 3:
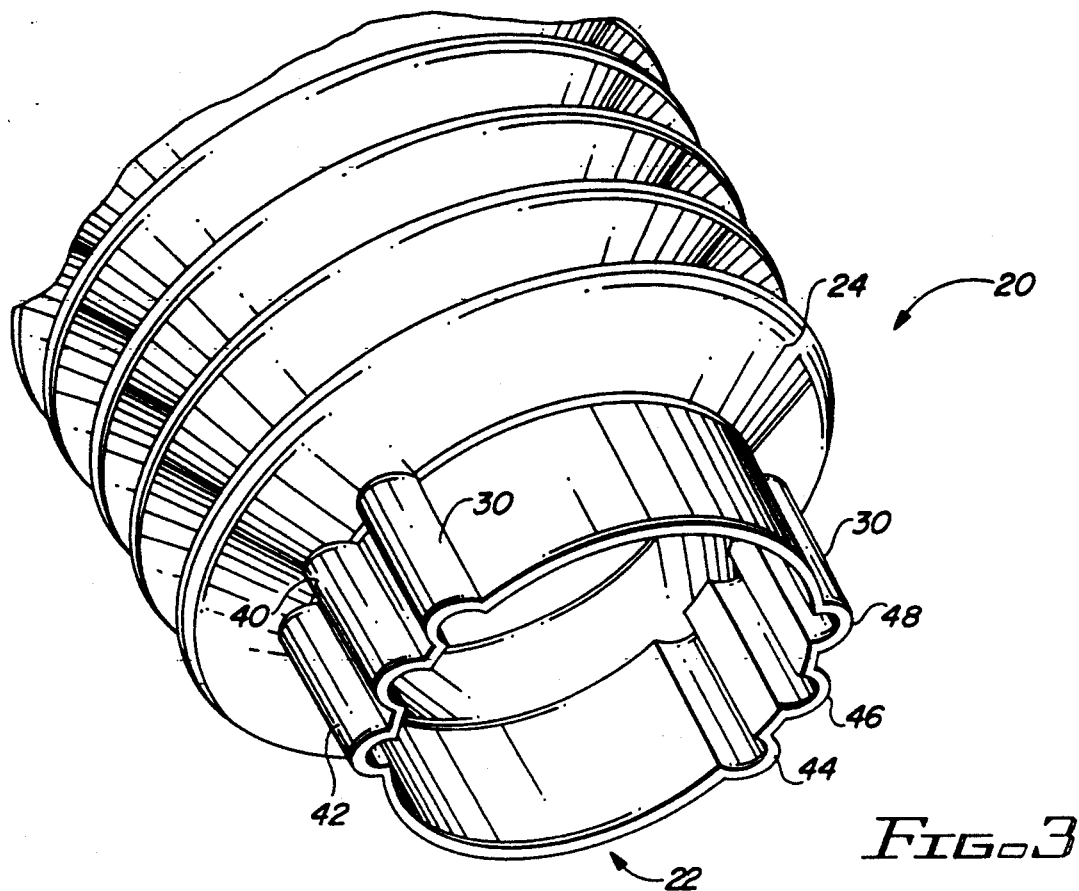
FIG. 3 is a perspective isometric view of the cuff end of an automotive boot.

The configuration and operation of cuff 22 will be described in greater detail with joint reference to FIGS. 1, 2 and 3. The cuff of a shock absorber is normally a band of elastic material encircling the cylinder end of a shock absorber or like device to be protected. Normally, the material of the boot permits approximately a 5% circumferential elongation of the cuff. Such elongation will accommodate a small range of cylinder end diameters. For diameters larger or smaller than this range, a boot having a differently sized cuff must be employed.

Cuff 22 includes one or more axially aligned bellows 30 formed in the cuff and extending to the first circular bellows 24. By circumferentially stretching cuff 22, axial bellows 30 will tend to flatten as a function of the degree of stretch. Flexing of first bellows 24 attached thereto will occur to accommodate such flattening.

By inspection, it will be apparent that the circumference of cuff 22 can be readily increased as a result of flattening one of axial bellows 30. The degree of circumferential increase is, of course, a function of the depth or size of bellows 30.

It will therefore be immediately apparent that cuff 22 is useable within a cylinder end size range greater than that of a cuff without axial bellows 30 simply by flattening the bellows. Since cuff 22 may be stretched or elongated approximately 5%, and as the circumferential length of cuff 20 has been increased by an amount equivalent to the distance around axial bellows 30 less the distance between sides 32,34 of the axial bellows 30, the elongatable distance is increased. By having a plurality of axial bellows 40,42,44,46 and 48 in addition to bellows 30, the cylindrical end size range accommodatable by cuff 30 may be substantially increased.

Material presently used for boot 20 provides substantial resiliency and elasticity to relatively firmly grip and retain cylinder end 10 therewith. A boot made of similar material and having a plurality of axial bellows 30 will provide a commensurate degree of grip about a cylindrical end. Accordingly, a clamp, ties or similar retention means will not be needed for most applications to retain boot 20 about the cylinder end. Unless each of axial bellows 30 is fully stretched, one or more of the bellows will provide a passageway to the interior of boot 20. Such passageway will serve as a vent to accommodate volumetric expansion and contraction of the boot during normal use.

Figure 4:
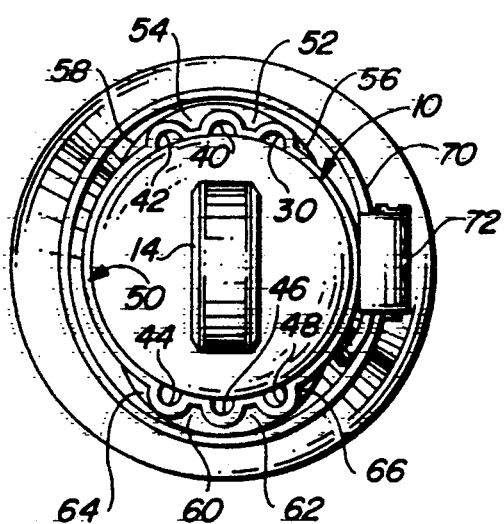
FIG. 4 illustrates a variant of the cuff.
Figure 5:
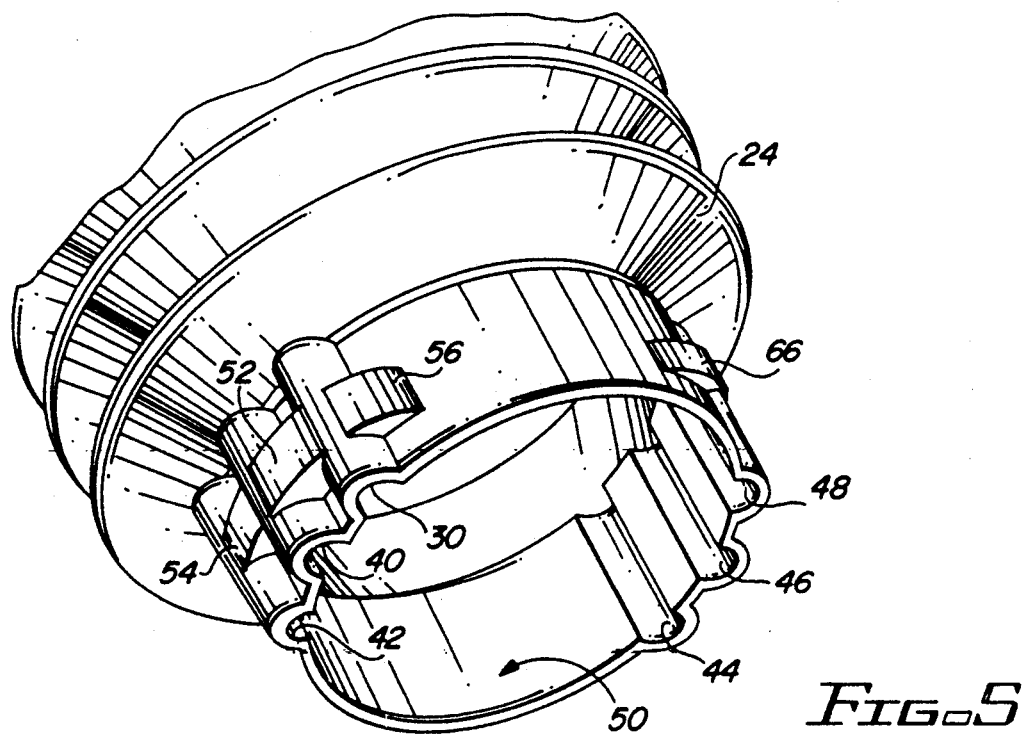
FIG. 5 illustrates a perspective isometric view of the variant.

If, in addition to the gripping force of cuff 22, a clamp or tie (such as one of the grooved strap and ratchet type) is employed to tightly secure the cuff to a cylinder end 10, a modified or variant version of the cuff, as shown in FIGS. 4 and 5 may be employed. Variant cuff 50 may include a plurality of axial bellows 30,40,42,44,46 and 48 as described above. To prevent collapse, either full or complete, of these axial bellows in response to the forces applied by a clamp or tie, support means for maintaining the axial bellows air transmissive may be employed. The support means may include bridge members 52,54 disposed between bellows 30,40 and 40,42, respectively. Ramp members 56,58 may extend from bellows 30,42, respectively, to the surface of cuff 50. Similar bridge members 60,62 and ramp members 64,66 may be employed in conjunction with bellows 42,46,48, as illustrated.

Upon wrapping a clamp strap or tie 70 about variant cuff 50 and securing it tightly thereabout with securing means 72, the compressive forces imposed by the tie will be resisted by the bridge and ramp members attendant the axial bellows. That is, these bridge and ramp members will provide support for the tie to prevent complete flattening of the axial bellows against encircled cylinder end 10. The venting capability is thereby maintained even though variant cuff 50 is tightly attached to the cylinder end with an encircling clamp strap or tie. It is to be understood that the number of bridge members and ramp members employed will be a function of the number of axial bellows formed in variant cuff 50 as well as the degree and extent of collapse of the axial bellows anticipated as a result of use of a clamp or tie.

The number, width and depth of axial bellows 30 is a function of the range of diameters of cylinder ends 10 to be accommodated as well as a function of the characteristics of the material of which boot 20 is manufactured. The axial bellows may be arranged equiangularly about cuff 22, in a group or groups of two or more symmetrically arranged about the bellows, as illustrated, or asymmetrically arranged.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. A bellows for protecting an extensible device, said bellows comprising in combination:
   (a) a cuff extending from one end of said bellows for encircling an element of the extensible device; and
   (b) at least one axial bellows formed in said cuff, said axial bellows being flattenable commensurate with the degree of elongation of said cuff resulting from encircling attachment of said cuff with the element of the extensible device.

2. The apparatus as set forth in claim 1 including more than one of said axial bellows formed in said cuff for increasing the range of elongation of said cuff.

3. The apparatus as set forth in claim 2 wherein said cuff includes groups of said axial bellows disposed about said cuff.

4. The apparatus as set forth in claim 1 wherein said protective bellows includes a radially oriented bellows for supporting said cuff and wherein at least one of said axial bellows extends from said radially oriented bellows along the axial length of said cuff for venting said protective bellows.

5. The apparatus as set forth in claim 1 wherein said axial bellows includes means for venting said protective device.

6. The apparatus as set forth in claim 1 including support means disposed upon said cuff for supporting a clamping device to secure said cuff about the encircled element.

7. The apparatus as set forth in claim 6 wherein said support means includes means for preventing collapse of said axial bellows.

8. The apparatus as set forth in claim 7 wherein said axial bellows includes means for venting said protective device.

9. The apparatus as set forth in claim 6 wherein said support means includes bridge members extending between adjacent ones of said axial bellows.

10. The apparatus as set forth in claim 6 wherein said support means includes a ramp member extending from at least one of said axial bellows.

11. The apparatus as set forth in claim 1 including means for preventing collapse of said axial bellows upon attachment of a clamping device to secure said cuff about the encircled element.

12. A circumferentially expandable cuff of a protective bellows for accommodating a range of circumferences, which protective bellows includes at least one radial bellows, said cuff comprising in combination:
 (a) at least one radially outwardly oriented channel formed in said cuff; and
 (b) means for extending said channel from the radial bellows of the protective bellows adjacent said cuff.

13. The apparatus as set forth in claim 12 including means for venting the protective bellows through said channel.

14. The apparatus as set forth in claim 13 including support means disposed upon said cuff for supporting a clamping device to secure said cuff about the encircled element to prevent collapse of said axial bellows.

15. The apparatus as set forth in claim 12 wherein each of said channels is axially oriented along said cuff.

16. The apparatus as set forth in claim 15 including a plurality of said channels formed in said cuff.

17. The apparatus as set forth in claim 12 including support means disposed upon said cuff for supporting a clamping device to secure said cuff about the encircled element.

18. The apparatus as set forth in claim 12 including means for preventing collapse of said axial bellows upon attachment of a clamping device to secure said cuff about the element to be protected.

* * * * *